Feb. 23, 1971          J. W. KEPHART, JR          3,564,785
                       BUILDING STRUCTURE

Filed June 19, 1969                            7 Sheets-Sheet 1

INVENTOR
JOHN W. KEPHART JR.

BY *Louis V Schiavo*

ATTORNEY

Feb. 23, 1971 — J. W. KEPHART, JR — 3,564,785
BUILDING STRUCTURE
Filed June 19, 1969 — 7 Sheets-Sheet 5

INVENTOR
JOHN W. KEPHART JR.
BY Louis V Schiavo
ATTORNEY

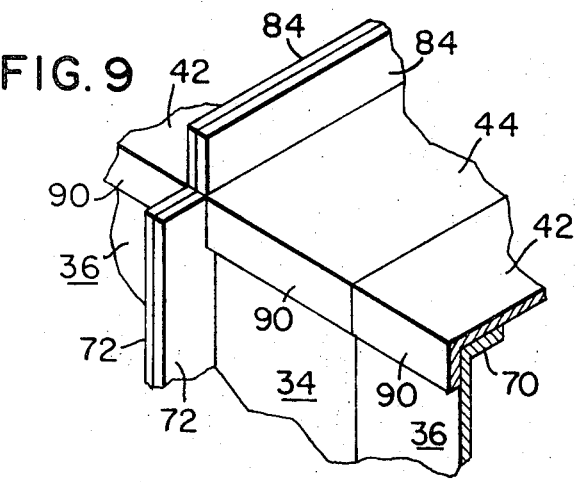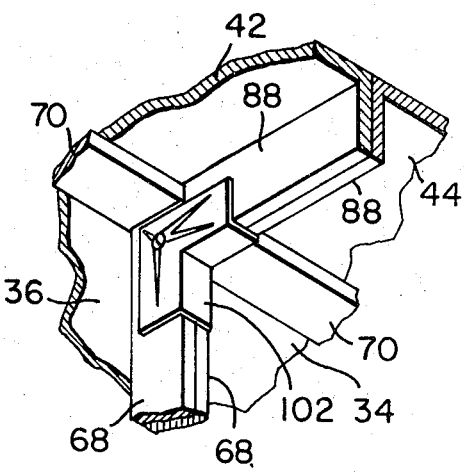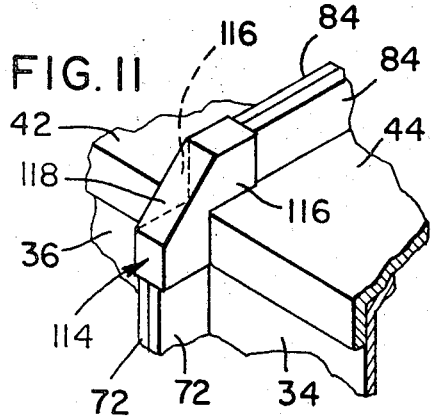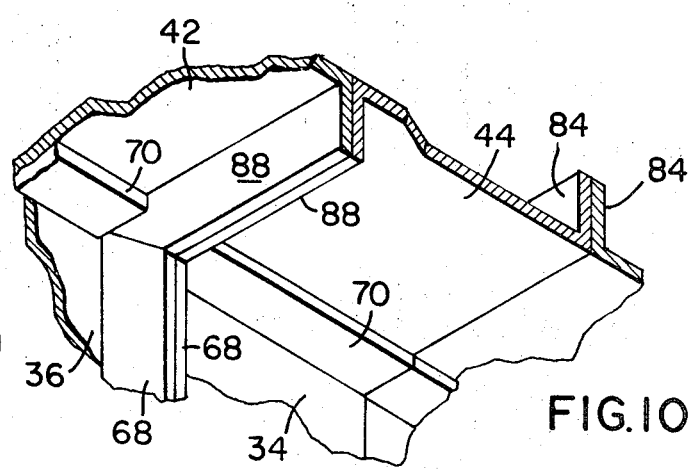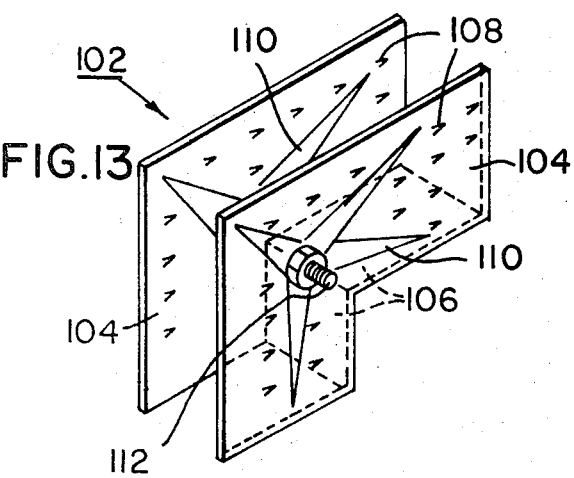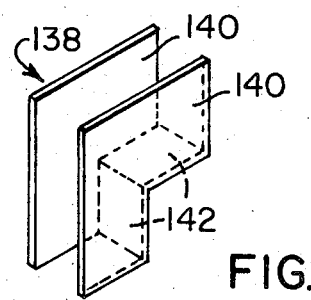

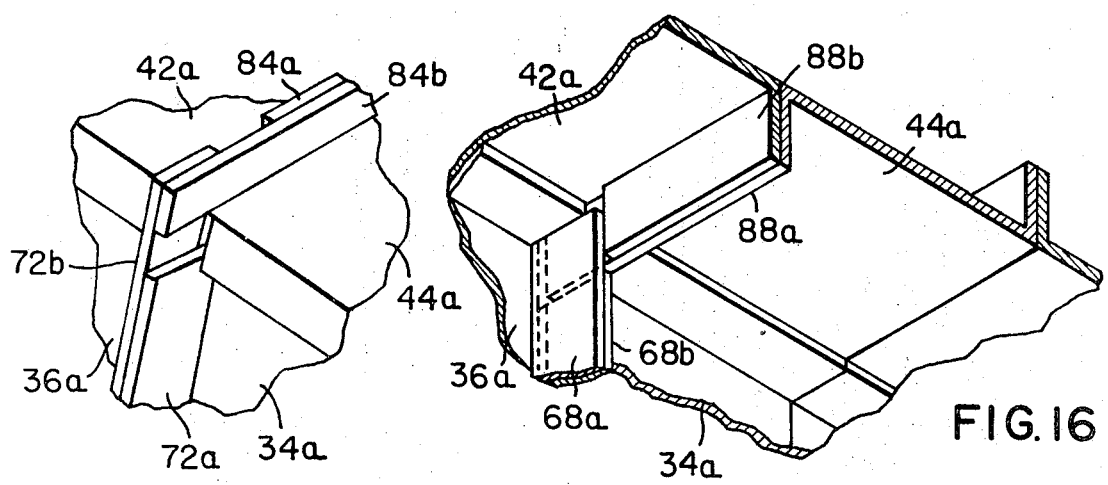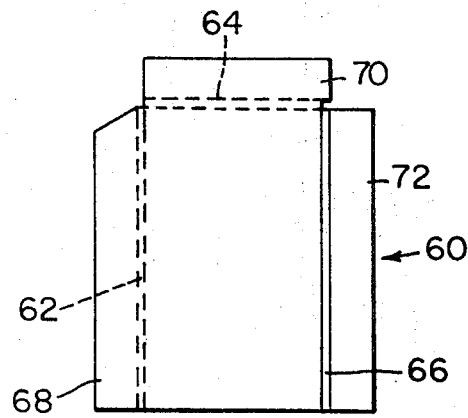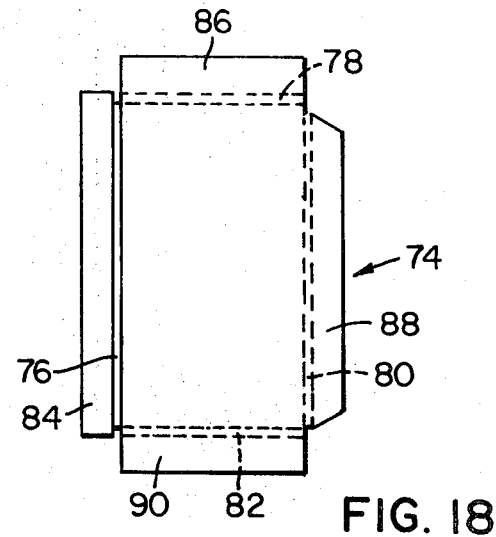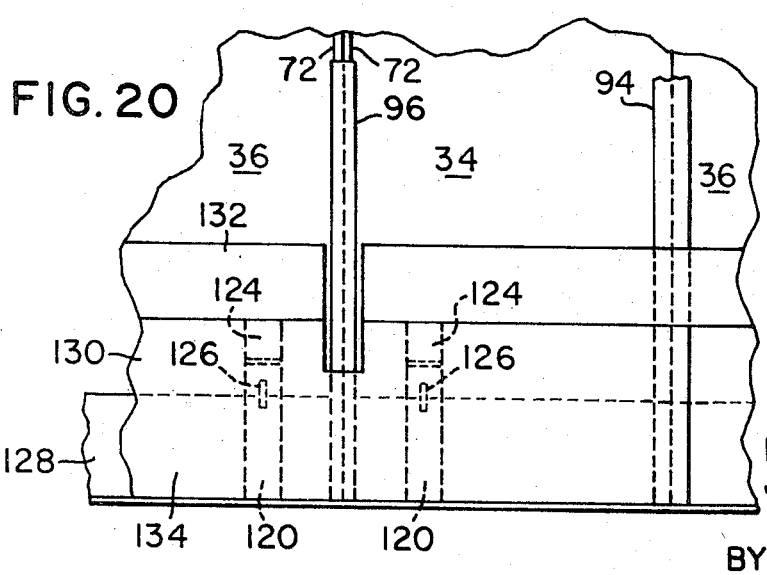

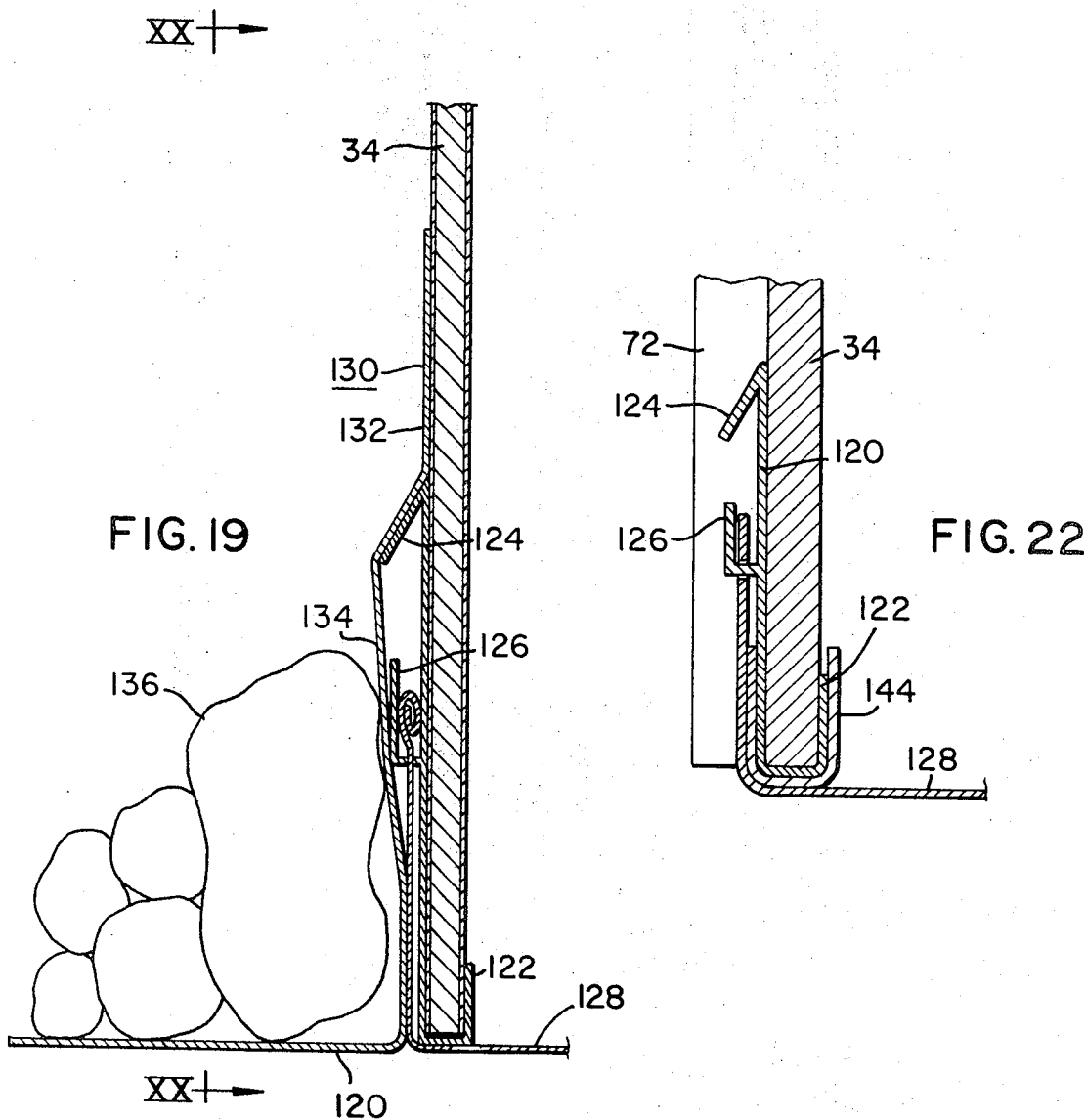

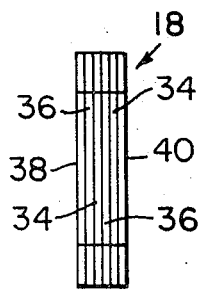
FIG. 23
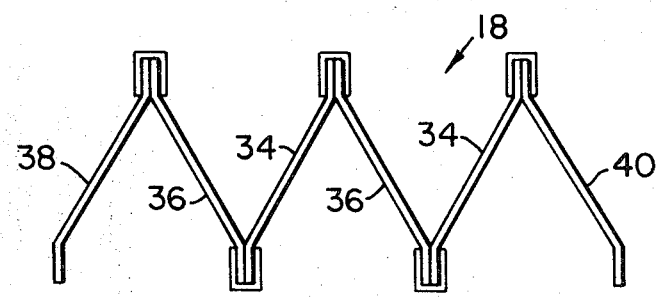
FIG. 24
FIG. 25
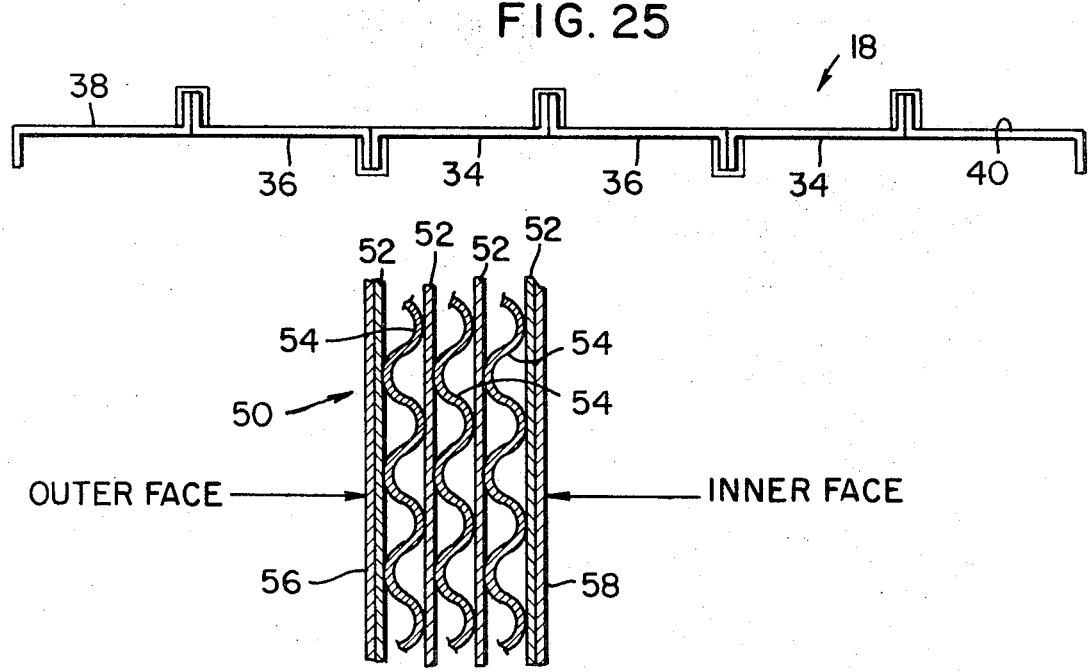
FIG. 26
INVENTOR
JOHN W. KEPHART JR.

United States Patent Office 3,564,785
Patented Feb. 23, 1971

3,564,785
BUILDING STRUCTURE
John W. Kephart, Jr., 1115 Norsam Road,
Gladwyne, Pa. 19035
Filed June 19, 1969, Ser. No. 834,713
Int. Cl. E04b 1/32, 1/344
U.S. Cl. 52—71
20 Claims

ABSTRACT OF THE DISCLOSURE

A plurality of sheet material panels are shop assembled to thereby form a wall or the roof of a building structure. The panels of the wall or roof are hinged to each other for being folded each upon the others for delivery of the wall or roof to the building site in a compact bundle to facilitate handling and shipping thereof, and for being unfolded at the building site prior to being erected in position.

BACKGROUND OF THE INVENTION

(1) Field of the invention

The present invention relates to a building system.

(2) Description of the prior art

Systems wherein the component parts of an upright wall or the roof of a building structure may be compactly bundled to facilitate handling and shipping to the building site are known. However, the component parts of the wall or roof are not assembled and interconnected in the shop, but to the contrary they are assembled and interconnected at the building site. In the construction industry, for reasons of economy, it is preferred to avoid as much field work as possible.

SUMMARY OF THE INVENTION

An object of the invention is to provide a building system wherein each wall and the roof is in the form of a plurality of panels of sheet material assembled and interconnected in the shop and capable of being folded each upon the others for delivery of the wall or roof to the building site in a compact bundle and for unfolding and erection thereof at the building site with maximum facility.

BRIEF DESCRIPTION OF DRAWINGS

FIG. 9 is a fragmentary perspective view at the juncture of exterior sidewall and roof ribs, with the rib interconnecting corner bracket omitted;

FIG. 10 is a fragmentary perspective view at the juncture of interior sidewall and roof panel ribs, with the rib interconnecting corner bracket omitted;

FIG. 11 is similar to FIG. 9, but shows the rib interconnecting corner bracket in position;

FIG. 12 is similar to FIG. 10, but shows the rib interconnecting corner bracket in position;

FIG. 13 is a perspective view of the interior corner bracket shown in FIG. 12;

FIG. 14 is a perspective view of an alternate form of interior corner bracket;

FIG. 15 is similar to FIG. 11, but shows an alternate method of interconnecting the exterior sidewall and roof panel ribs;

FIG. 16 is similar to FIG. 12, but shows an alternate method of interconnecting the interior sidewall and roof panel ribs;

FIG. 17 is a developed view of a typical sidewall panel blank;

FIG. 18 is a developed view of a typical roof panel blank;

FIG. 19 is a vertical section showing the means for anchoring the sidewalls of the building to the ground;

FIG. 20 is a fragmentary elevation, as indicated by lines XX—XX in FIG. 19;

FIG. 21 is a fragmentary perspective view showing the base of a sidewall of the building seated in a channel sill;

FIG. 22 is similar to FIG. 19, but the skirt is not shown and the base of the sidewall is seated in a channel sill;

FIG. 23 is an end view of a sidewall of the building showing the panels of the sidewall folded each upon the others to form a compact bundle to facilitate handling and shipping thereof to the building site;

FIG. 24 is a view similar to FIG. 23, but shows the sidewall partially unfolded;

FIG. 25 is a view similar to FIGS. 23 and 24, but shows the sidewall fully extended; and FIG. 26 is a fragmentary section through the sheet material out of which the sidewall and roof panels are fabricated.

DESCRIPTION OF THE PREFERRED EMBODIMENT

Figure 1:
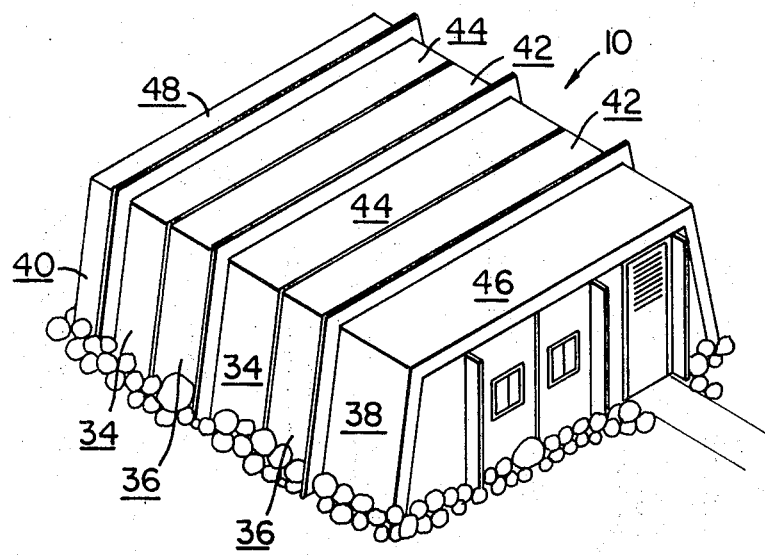
FIG. 1 is a perspective view of a building constructed in accordance with the present invention.
Figure 2:
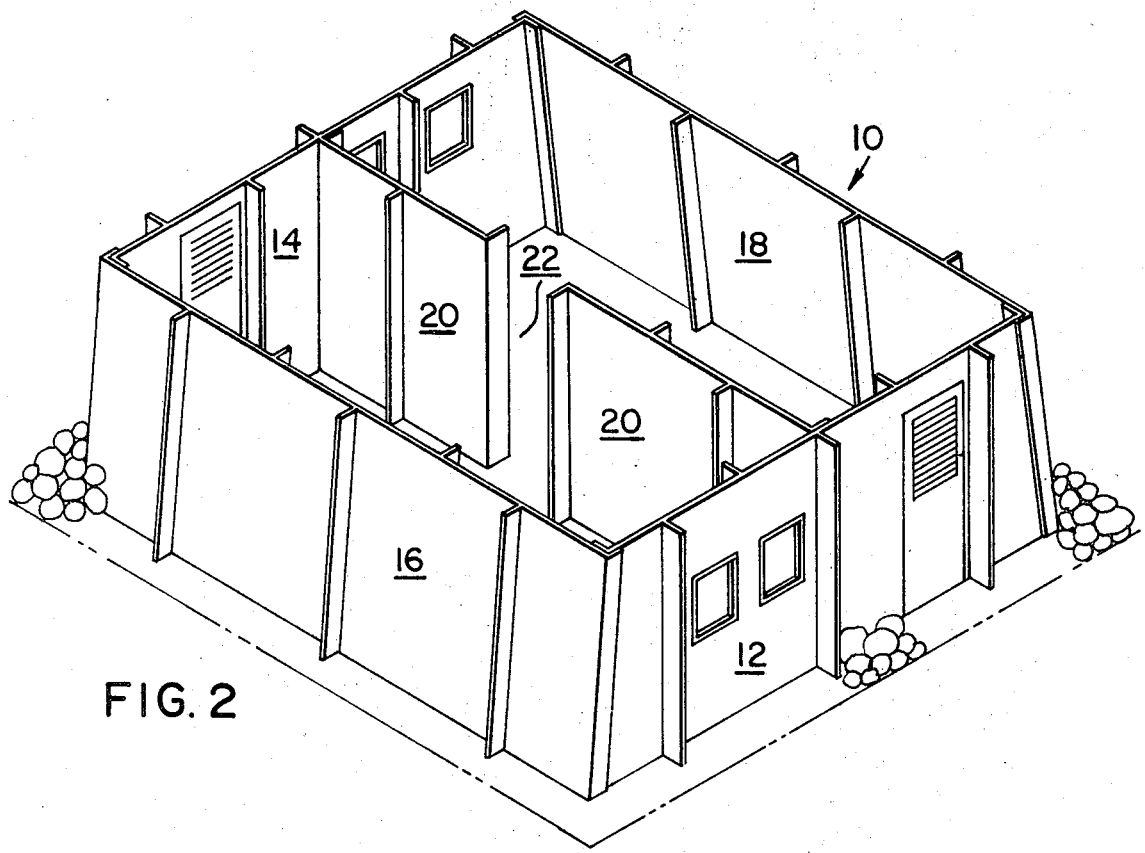
FIG. 2 is a perspective view of the building, with the roof removed to expose the interior of the building.
Figure 3:
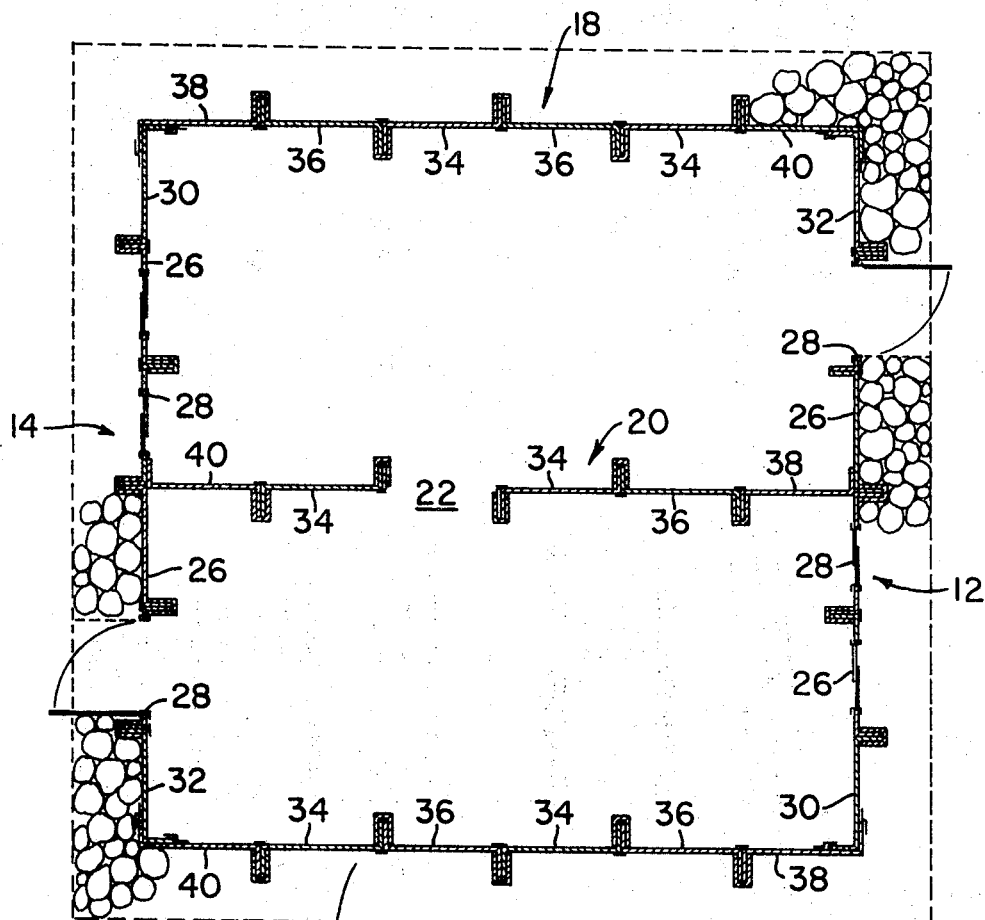
FIG. 3 is a floor plan of the building.
Figure 4:
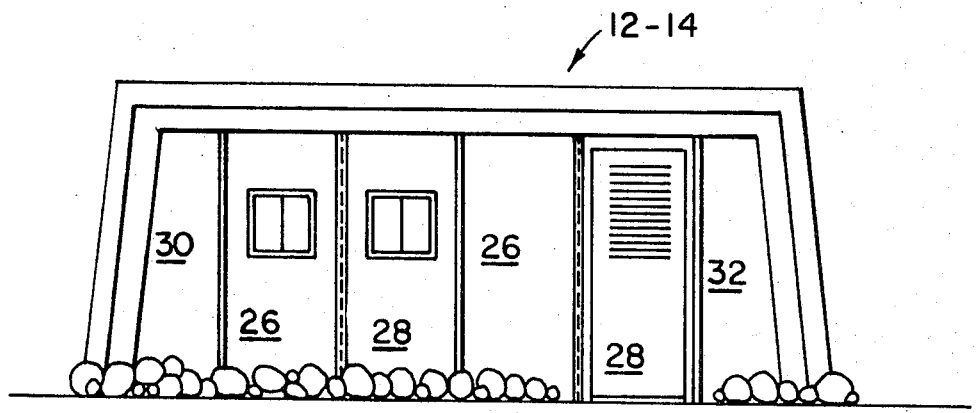
FIG. 4 is a front or rear elevation of the building.
Figure 5:
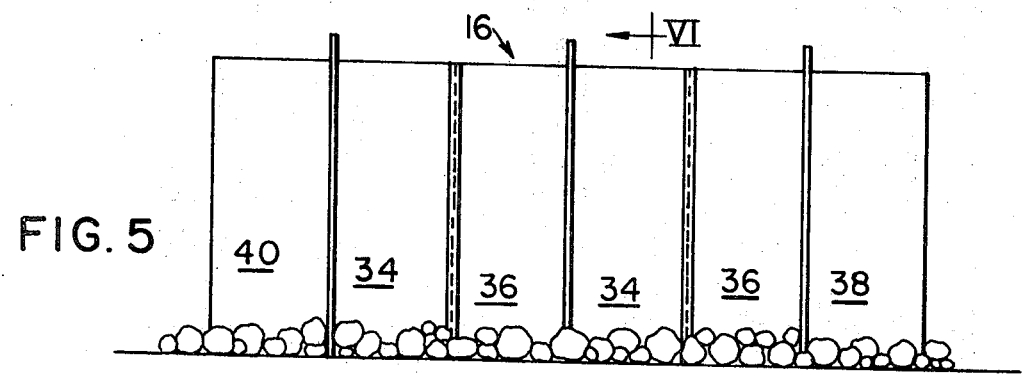
FIG. 5 is a side elevation of the building.
Figure 6:
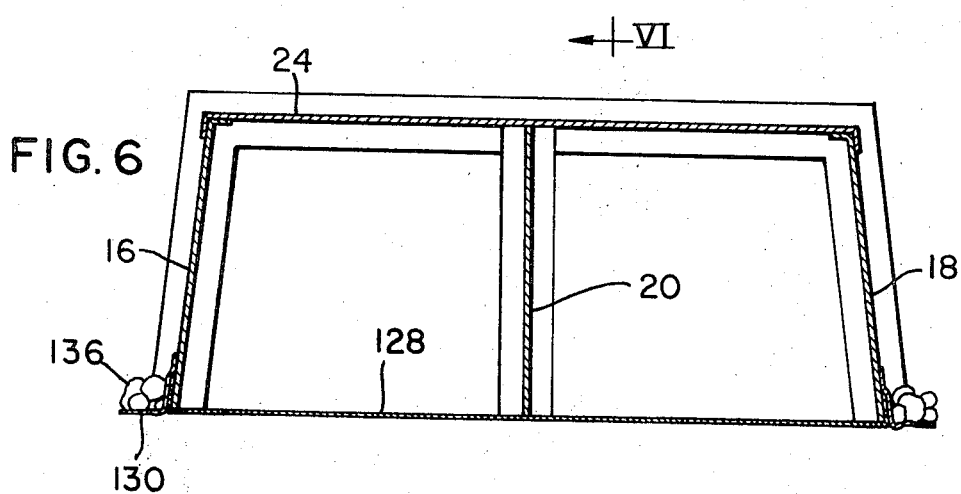
FIG. 6 is a vertical section through the building, taken on line VI—VI in FIG. 5.

The following description is directed to the specific embodiment of the invention disclosed in the drawings. It is not addressed to the scope of the invention which may be practiced in a variety of forms.

Referring particularly to FIGS. 1 to 6, the building constructed in accordance with the invention, generally designated 10, comprises a set of upright walls including identical sidewalls 12 and 14 respectively at the front and rear of the building, identical sidewalls 16 and 18 respectively on the left and right sides of the building, and a partition 20, with a door opening designated 22. These upright walls carry a roof designated 24.

Each sidewall 12 and 14 includes intermediate panels 26 alternating with intermediate panels 28, and corner panels 30 and 32 respectively at opposite ends thereof. Selected ones of these panels may be furnished with doors or windows, as shown, but for the purposes of this disclosure, the doors and windows are ignored.

Each sidewall 16 and 18 includes intermediate panels 34 alternating with intermediate panels 36, and corner panels 38 and 40 respectively at opposite ends thereof.

The roof includes intermediate panels 42 alternating with intermediate panels 44 and opposite end panels 46 and 48.

Referring particularly to FIG. 26, each building panel of each upright wall and the roof is made of a single sheet of laminated triple wall corrugated fiber board including four uncorrugated plies 52, three corrugated filler plies 54, an outer ply or facing of moisture-proof sheet material 56, and an inner ply or facing of fire-resistant sheet material 58. The outer facing 56 may be any suitable plastic material, while the inner facing 58 may be any suitable plastic material or asbestos paper. Either triple wall or double wall corrugated fiber board made by Tri-Wall Containers, Inc., Plainfield, N.Y., modified by applying the moisture-proof facing 56 to the outer face thereof and the fire-resistant facing 58 to the inner face thereof, is suitable for the purpose intended.

Referring particularly to FIG. 17, each sidewall panel is die-cut and typically scored, as at 62 and 64 on the inner face thereof, and as at 66 on the outer face thereof, whereby to afford longitudinally extending flanges 68 and 72 and transversely extending flange 70. Thereafter, the flanges 68 and 72 are turned about the score lines 62 and 66 respectively inwardly and outwardly in opposite directions, and flange 70 is turned about the score line 64 inwardly in the same direction as flange 68.

Referring particularly to FIG. 18, each roof panel is die-cut and typically is longitudinally scored, as at 76 on the outer face thereof, and as at 80 on the inner face thereof, and transversely scored, as at 78 and 82 on the inner face thereof, whereby to afford longitudinally extending flanges 84 and 88 and transversely extending flanges 86 and 90. Thereafter, the flanges 84 and 88 are turned about the score lines 76 and 80 respectively outwardly and inwardly in opposite directions, and the flanges 86 and 90 are turned about the score lines 78 and 82 inwardly in the same direction as flange 88.

Figure 8:
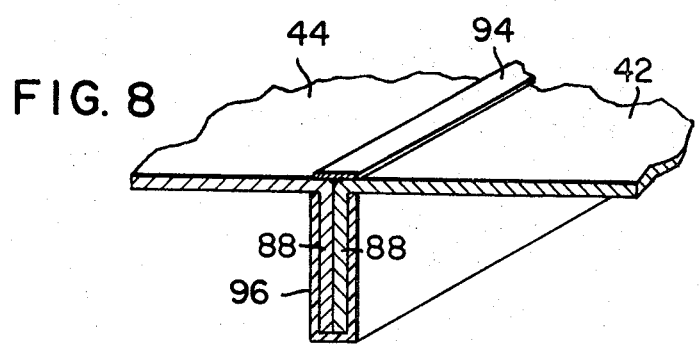
FIG. 8 is a perspective view showing details of a typical interior rib formed by abutting flanges of two adjacent building panels.
Figure 7:
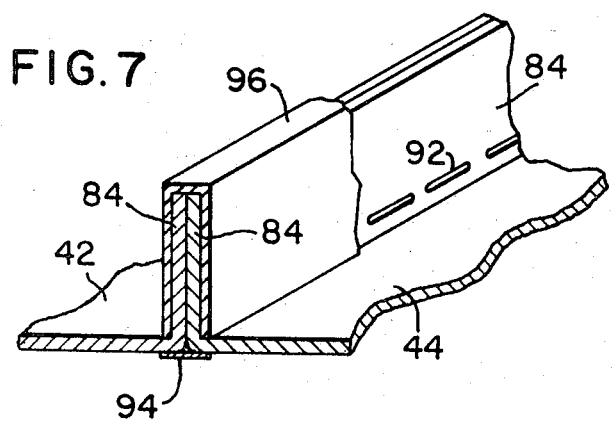
FIG. 7 is a perspective view showing details of a typical exterior rib formed by abutting flanges of two adjacent building panels.

The panels of each upright wall and of the roof are disposed in side-by-side relation with opposed flanges respectively of each pair of adjacent panels abutting and thereby acording a rib. The abutting panel flanges of adjacent roof panels afford ribs which function as beams that span the enclosure and carry the roof load to the sidewalls, and the abutting panel flanges of adjacent sidewall panels afford ribs which conjointly function as columns that carry the roof load to the ground. Alternate ribs face inwardly of the building while intervening ribs face outwardly of the building. Referring particularly to FIGS. 7 and 8, the abutting panel flanges, of roof panels 42 and 44, for example, are stitched together by a line of staples 92 close to the heels of the flanges, and the seam between the panels is sealed by a flexible strip of plastic tape 94 of the pressure-sensitive type applied across the heels of the flanges. In addition, fitted over the toes of the flanges is an extruded plastic cap 96 of U-shape in transverse section. The inner surfaces of the cap 96 are treated with a pressure-sensitive agent for adhering to the panel flanges. If desired, a flexible strip of plastic tape of the pressure-sensitive type may be substituted for the extruded plastic cap 96.

Referring particularly to FIG. 12, a corner bracket 102 is provided for interconnecting each inwardly facing rib of the sidewalls 12 and 14 with the aligned inwardly facing rib of the roof 20. Referring particularly to FIG. 13, the bracket 102 comprises a sheet metal body with laterally spaced sections 104 interconnected by a section 106. Struck from each section 104 are a multiplicity of prongs 108 facing inwardly, and pressed into each section 104 is a reinforcing rib 110. Interconnecting the sections 104 is a pin 112 for pressing the prongs 108 into the flanges disposed between the sections 104.

Referring particularly to FIG. 11, a corner bracket 114 is provided for interconnecting each outwardly facing rib of the sidewalls 12 and 14 with the aligned outwardly facing rib of the roof 24. The bracket 114 is a molded body of plastic material with laterally spaced sections 116 interconnected by a section 118. The inner surfaces of the bracket 114 are treated with a pressure-sensitive agent for adhesion to the panel flanges disposed between the sections 116.

Referring particularly to FIGS. 19 to 22, at selected locations about the building, preferably close to the outwardly facing ribs of the sidewalls, are clips 120. The lower end of the clip 120 is hooked, as at 122, about the lower extremity of the associated sidewall panel and the upper end is provided with an outwardly and downwardly extending flange 124. A hook 126 is struck from the upstanding leg of the clip, and a sheet of plastic material 128, spread over the floor of the building and passed under the sidewalls thereof, is turned upwardly and attached to the hooks 126. A skirt of plastic material, generally designated 130, is provided with an upper marginal area 132 affixed to the outer face of the sidewall and extends downwardly, as at 134, over the flanges 124 and the hooks 126 and is spread outwardly over the ground for being weighted down with rocks, stones, sand, etc., designated 136, as shown.

Instead of the corner bracket 102 shown in FIG. 13, the corner bracket shown in FIG. 14 may be used. The bracket 138 is a molded body of plastic material with a laterally spaced section 140 interconnected by a section 142. The inner surfaces of the bracket 138 are coated with a pressure-sensitive agent for adhesion to the panel flanges.

Now referring particularly to FIGS. 15 and 16, the brackets 102, 138 and 114 may be dispensed with entirely, and one of the abutting flanges (84b in FIG. 15 and 88a in FIG. 16) of the roof panels may be extended beyond the other (84a in FIG. 15 and 88b in FIG. 16) and one of the abutting flanges (72b in FIG. 15 and 68a in FIG. 16) of the sidewall panels may be extended beyond the other (72a in FIG. 15 and 68b in FIG. 16). The terminal portions of the extended flanges are overlapped as shown and adhesively secured together.

Now referring particularly to FIG. 21, the base of the sidewall may be seated in a sill, generally designated 144. The sill is channel-shaped, being provided with laterally spaced flanges 146 and an interconnecting web 148. Recesses 150 are provided in the flanges 146 for accommodating the ribs of the sidewalls, as shown.

Referring particularly to FIG. 25, the sidewall 18, for example, may be assembled in the factory. Panels 34, 36, 38 and 40 are placed side by side with the flanges of each pair of adjacent panels abutting and with the abutting flanges of alternate pairs thereof facing in one direction and the abutting flanges of intervening pairs thereof facing in the opposite direction. The heels of the abutting flanges are stitched together by a line of staples and the toes of the flanges are capped. Thereupon, the sidewall is folded through the condition shown in FIG. 24 to the condition shown in FIG. 23, wherein the sidewall is shown fully folded up, with each panel folded upon the others to form a compact bundle for easy handling and shipping to the building site. At the building site, the sidewall is unfolded, through the condition shown in FIG. 24 to that shown in FIG. 25, and is erected in the unfolded condition thereof. It will be understood that each of the upright walls of the building and the roof may be assembled in the shop, folded up, shipped to the building site, and there unfolded and erected as indicated hereinabove with respect to sidewall 18.

While in accordance with the provisions of the patent statutes, I have illustrated and described the best form or embodiment of my invention now known to me, it will be apparent to those skilled in the art that changes may be made in the form of the structure described without departing from the spirit and scope of the invention as set forth in the appended claims.

What is claimed is:

1. A building structure comprising:
   (A) a plurality of panels each consisting of a single section of sheet material, said panels being disposed in side-by-side interconnected series relation whereby certain of said panels form upright walls including the sidewalls of an enclosure and others of said panels form a roof over said enclosure carried by said sidewalls,
      (1) each of said sidewall and roof panels being scored to thereby form a pair of longitudinally extending opposite side flanges respectively turned laterally in opposition directions from the main body of said panel, and whereby to form at least one transversely extending terminal flange turned laterally from the main body of said panel, (2) the opposed longitudinally extending flanges of each pair of adjacent sidewall panels and the opposed longitudinally extending flanges of each pair of adjacent roof panels being disposed in abutting relation, with alternate abutting pairs thereof affording ribs facing inwardly of said enclosure and intervening abutting pairs thereof affording ribs facing outwardly of said enclosure, (3) the proximate longitudinally extending marginal areas respectively of each pair of sidewall panels meeting to form a corner of said enclosure being disposed in interconnected mutually overlapping relation, and (4) the marginal areas of said roof panels conjointly forming the peripheral area of said roof and the marginal areas of said sidewall panels conjointly defining the top of said enclosure being disposed in interconnected mutually overlapping relation.

2. A building structure according to claim 1 wherein the opposed longitudinally extending flanges of each pair of adjacent roof panels fully span opposed sidewalls of the enclosure and are interconnected for conjointly functioning as a structural beam carrying the roof load to said sidewalls.

3. A building structure according to claim 2 wherein the opposed longitudinally extending flanges of each pair of adjacent sidewall panels extend the full height of said sidewalls and are interconnected for conjointly functioning as a structural column carrying the roof load.

4. A building structure according to claim 3 wherein each roof panel and a pair of opposed sidewall panels spanned thereby conjointly afford an aligned panel assembly of inverted U-shape, and the opposed flanges of each pair of adjacent panel assemblies are aligned and thereby disposed in a common upright plane.

5. A building structure according to claim 4 wherein the seam between each pair of adjacent panel assemblies is effectively sealed by strip means respectively covering the heels and toes of the opposed flanges of said panel assemblies.

6. A building structure according to claim 4 wherein the opposed flanges of each alternate pair of adjacent panel assemblies face inwardly of said enclosure and the opposed flanges of each intervening pair of adjacent panel assemblies face outwardly of said enclosure.

7. A building structure according to claim 6 wherein the opposed flanges of each alternate pair of adjacent panel assemblies facing inwardly of the enclosure are interconnected by corner brackets each embracing opposed terminal flange portions respectively of the roof and sidewall panels.

8. A building structure according to claim 7 wherein each corner bracket consists of a body of molded plastic material having interconnected laterally spaced sections with opposed surfaces coated with pressure-sensitive adhesive and thereby affixed to the opposed flanges disposed therebetween whereby to effectively hold said flanges together.

9. A building structure according to claim 7 wherein each corner bracket includes a sheet metal body having interconnected laterally spaced sections with prongs struck therefrom and facing inwardly, and a pin extending through said sections and operative for pressing said prongs into the flanges disposed therebetween whereby to effectively hold said flanges together.

10. A building structure according to claim 6 wherein the opposed flanges of each intervening pair of adjacent panel assemblies facing outwardly of the enclosure are interconnected by corner brackets each embracing proximate terminal flange portions respectively of the roof and sidewall panels.

11. A building structure according to claim 10 wherein each corner bracket consists of a body molded plastic material having interconnected laterally spaced sections with opposed surfaces coated with pressure-sensitive adhesive and thereby affixed to the opposed flanges disposed therebetween whereby to effectively hold said flanges together.

12. A building structure according to claim 6 wherein the opposed flanges of each intervening pair of adjacent panel assemblies facing outwardly of the enclosure are provided with overlapping terminal portions affixed to each other for interconnecting the flanges of the sidewall and roof panels.

13. A building structure comprising:
(A) a plurality of panels each consisting of a single section of sheet material, said panels being disposed in side-by-side interconnected series relation to thereby form the sidewalls of an enclosure,
   (1) each of said sidewalls being scored to thereby form a pair of longitudinally extending opposite side flanges respectively turned laterally in opposite directions from the main body of said panels,
   (2) the opposed longitudinally extending flanges of each pair of adjacent sidewall panels being disposed in abutting relation, with alternate abutting pairs thereof affording ribs facing inwardly of said enclosure and intervening abutting pairs thereof affording ribs facing outwardly of said enclosure,
   (3) the proximate longitudinally extending marginal areas respectively of each pair of sidewall panels meeting to form a corner of said enclosure being disposed in interconnected mutually overlapping relation, and
(B) means for anchoring said sidewalls to the ground including:
   (1) skirt means of flexible sheet material affixed to lower end portions of the sidewalls of the enclosure and extending freely therefrom a distance sufficient for being spread upon the ground and weighted down.

14. A building structure according to claim 13 wherein the sidewall anchoring means includes:
(A) a plurality of laterally spaced clips each hooked around the lower extremity of the associated sidewall panel and extending upwardly along the outside of said panel between said panel and the skirt, said clip being provided with a downwardly and outwardly extending flange at the upper extremity thereof and with a hook disposed under said flange, and
(B) a sheet of flexible material spread over the floor of said enclosure and having a peripheral area extending outwardly under said sidewalls, turned upwardly and attached to said hooks, said skirt being disposed in overlying relation to said flange and the turned up peripheral area of said floor sheet.

15. A building structure according to claim 14 wherein the lower extremities of the sidewall panels and the clips hooked therearound are seated in sill members of U-shape in transverse section, said sill members being operative to hold said sidewall panels in alignment.

16. A building structure according to claim 13 wherein the lower extremities of the sidewall panels are seated in sill members of U-shape in transverse section, said sill members being operative to hold said sidewall panels in alignment.

17. An assembly of panels each consisting of a single section of sheet material, said panels being disposed in side-by-side interconnected series relation thereby to afford a wall or roof for a building structure,
(A) each of said panels being scored to thereby form a pair of longitudinally extending opposite side flanges respectively turned laterally in opposite directions from the main body of said panel, (B) the opposed longitudinally extending flanges of each pair of adjacent panels being disposed in abutting relation, with alternate abutting pairs thereof affording ribs facing in one direction and intervening abutting pairs thereof affording ribs facing in the opposite direction, (C) the remote flanges of the panels respectively at opposite ends of the assembly thereof being turned in the same direction, and (D) said panels being foldable for positioning each adjacent pair thereof in flat mutually overlying relation thereby to collapse said building wall or roof into a compact bundle of panels to facilitate handling and shipping thereof.

18. An assembly of panels according to claim 17 wherein the flanges of said panels extend substantially the full length thereof and the opposed flanges of each pair of adjacent panels conjointly function as a structural member reinforcing the panel assembly for carrying the load thereon.

19. An assembly of panels according to claim 18 wherein the seam between each pair of adjacent panels is effectively sealed by strip means covering the toes of the opposed flanges of said panels.

20. An assembly of panels according to claim 18 wherein the abutting flanges of each pair of adjacent panels are interconnected by a line of staples securing the heels of said flanges together, and the seam between each pair of adjacent panels is effectively sealed by a molded strip of plastic material U-shaped in transverse section and fitted over the toes of said abutting flanges.

References Cited

UNITED STATES PATENTS

| 2,065,920 | 12/1936 | Clark | 52—275 |
| 2,871,521 | 2/1959 | Messmore | 52—80X |
| 3,080,022 | 3/1963 | Mote | 52—222X |
| 3,445,970 | 5/1969 | Nelson | 52—82X |
| 3,494,092 | 2/1970 | Johnson et al. | 52—69X |
| 3,505,765 | 4/1970 | Blaski | 52—80 |

PRICE C. FAW, Jr., Primary Examiner

U.S. Cl. X.R.

52—86, 105, 238, 275, 420, 630